(12) United States Patent
Tajima et al.

(10) Patent No.: US 11,578,006 B2
(45) Date of Patent: Feb. 14, 2023

(54) MANUFACTURING METHOD OF CERAMIC FORMED BODY

(71) Applicant: NGK INSULATORS, LTD., Nagoya (JP)

(72) Inventors: Yuichi Tajima, Nagoya (JP); Ryuji Yamaguti, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 873 days.

(21) Appl. No.: 16/106,215

(22) Filed: Aug. 21, 2018

(65) Prior Publication Data

US 2018/0354863 A1     Dec. 13, 2018

Related U.S. Application Data

(63) Continuation of application No. PCT/JP2017/006197, filed on Feb. 20, 2017.

(30) Foreign Application Priority Data

Mar. 9, 2016  (JP) .............................. JP2016-045325

(51) Int. Cl.
  *C04B 38/10*   (2006.01)
  *B28B 3/20*    (2006.01)
  *C04B 38/00*   (2006.01)

(52) U.S. Cl.
  CPC .............. *C04B 38/103* (2013.01); *B28B 3/20* (2013.01); *C04B 38/0006* (2013.01)

(58) Field of Classification Search
  None
  See application file for complete search history.

(56) References Cited

U.S. PATENT DOCUMENTS 5,021,213 A * 6/1991 Nishio .................. C04B 35/634
                                        264/125
5,884,138 A   3/1999 Chalasani et al.
(Continued)

FOREIGN PATENT DOCUMENTS

JP   2004-010373 A1   1/2004
JP   2004-524992 A1   8/2004
(Continued)

OTHER PUBLICATIONS

Siobhán Matthews, et al., "The Manufacture of Porous Ceramics Using Supercritical Fluid Technology," *Advanced Engineering Materials*, 2008, vol. 10, No. 3, pp. 253-255.
(Continued)

*Primary Examiner* — Timothy Kennedy
*Assistant Examiner* — Olukorede Esan
(74) *Attorney, Agent, or Firm* — Burr Patent Law, PLLC

(57) ABSTRACT

A manufacturing method of a ceramic formed body, including: a mixing step in which a raw material for forming a ceramic formed body is dryly mixed, and then, a liquid is added to the obtained dry mixture to wetly mix the mixture; a kneading step in which a mixture obtained in the mixing step is kneaded; an injection step in which supercritical carbon dioxide in the state of supercritical fluid is injected into a kneaded product obtained in the kneading step; and a forming step in which a forming raw material containing the supercritical carbon dioxide obtained in the kneading step and the injection step is extruded to form the ceramic formed body.

3 Claims, 3 Drawing Sheets

(56) References Cited

U.S. PATENT DOCUMENTS

| | | | | |
|---|---|---|---|---|
| 5,935,514 A * | 8/1999 | Ford, Jr. | ............ | B28B 3/20 |
| | | | | 264/630 |
| 6,759,004 B1 * | 7/2004 | Dwivedi | ............ | B22F 3/225 |
| | | | | 423/447.5 |
| 2004/0084795 A1 * | 5/2004 | Hornsby | ............ | B29C 45/0013 |
| | | | | 264/41 |
| 2006/0257620 A1 * | 11/2006 | Noguchi | ............ | B01D 46/2418 |
| | | | | 428/116 |
| 2009/0243167 A1 | 10/2009 | Ono et al. | | |
| 2012/0135854 A1 | 5/2012 | Chou | | |

FOREIGN PATENT DOCUMENTS

| | | | |
|---|---|---|---|
| JP | 4571990 | B2 | 10/2010 |
| JP | 2014-501684 | A1 | 1/2014 |

OTHER PUBLICATIONS

Siobhán Matthews, et al., "The Manufacture of Porous Ceramics Using Supercritical $CO_2$," *Ceramic Engineering and Science Proceedings*, 2008, vol. 22, No. 12, pp. 169-175.
International Search Report and Written Opinion (Application No. PCT/JP2017/006197) dated May 16, 2017.
German Office Action (with English translation), German Application No. 11 2017 001 194.9, dated Feb. 21, 2022 (9 pages).

\* cited by examiner

MANUFACTURING METHOD OF CERAMIC FORMED BODY

BACKGROUND OF THE INVENTION

1. Field of the Invention

The present invention relates to a manufacturing method of a ceramic formed body. More specifically, the present invention relates to a manufacturing method of a ceramic formed body for producing a ceramic structure having high porosity.

2. Description of Related Art

In the related art, a ceramic structure has been used in a wide variety of application such as a catalyst carrier for automobile exhaust gas purification, a diesel particulate filter, and a heat reservoir for a combustion apparatus. Ceramic structures often employ, for example, a honeycomb-shaped honeycomb structure including a lattice-shaped partition wall defining and forming a plurality of cells or fluid passages extending from one end face to the other end face. Such a honeycomb structure is produced by extruding a forming raw material (kneaded material) from a die (extrusion die) of an extrusion machine and forming a ceramic formed body of the desired shape, followed by a drying step and a firing step.

In recent years, higher performance has been required for ceramic structures such as honeycomb structures used for the application of all kinds as described above. For example, suppressing a pressure loss difference of fluid to be treated such as exhaust gas improves fuel consumption performance of an engine in an automobile or the like. Therefore, development in a ceramic structure having a small pressure loss difference is expected. Such a demand leads to development in a ceramic structure having a high porosity structure in which porosity of the porous ceramic structure is increased.

Raw materials containing various ceramic powders and a binder or the like are mixed at a predetermined blending ratio and then kneaded so that a forming raw material which is to be extruded from a die to form a ceramic formed body is adjusted to have a viscosity suitable for the extrusion. To this forming raw material, for example, starch, a foamable resin material, carbon powder, or water-absorbable resin is added as a "pore former" (see Patent Document 1). The additive pore former disappears from the forming raw material during a firing step in which the extruded ceramic formed body is fired at a high temperature.

Therefore, a large number of pores are formed in the inside of a ceramic structure after firing (corresponding to the inside of a partition wall of a honeycomb structure). In other words, adding the pore former to the forming raw material makes the ceramic structure have a high porosity structure. Herein, the porosity of the ceramic structure is adjustable to any degree by changing an amount of the pore former added to the forming raw material. Herein, a manufacturing method of a ceramic structure having a high porosity structure using a pore former (chemical substance) is defined as "chemical foaming".

On the other hand, there is a technique in which an inert gas such as nitrogen gas or argon gas is directly injected into a forming raw material, and the forming raw material injected with the inert gas is extruded by an extrusion machine (see Patent Document 2). Due to an action of the inert gas injected into the forming raw material, a ceramic product holding a large number of pores is produced. Herein, a manufacturing method of a ceramic structure having a high porosity structure utilizing a physical action by injection of an inert gas or the like is defined as "physical foaming".

CITATION LIST

Patent Documents

[Patent Document 1] JP-B1-4571990
[Patent Document 2] JP-W-2014-501684

SUMMARY OF THE INVENTION

Problem to be Solved by the Invention

Manufacturing of a ceramic structure having a high porosity structure by each of the methods, the "chemical foaming" and the "physical foaming", sometimes causes the following problems. Specifically, in the chemical foaming, in order to increase porosity of a ceramic structure, it is required to increase an amount of a pore former to be added in a forming raw material or to increase an addition ratio. This may result in an increase of material cost of the pore former in the forming raw material and affect the overall manufacturing cost of the ceramic structure.

Furthermore, for example, when a water-absorbable resin is used as a pore former, a forming raw material has a high moisture content (high liquid content) containing a large amount of moisture (liquid). This tends to increase the drying time required in a drying step to dry an extruded ceramic formed body. Accordingly, the entire manufacturing time of a ceramic structure is prolonged, leading to a reduction in manufacturing efficiency. Still further, energy cost required for drying may increase due to prolonged drying time in the drying step. Therefore, in order to make the ceramic structure have a high porosity structure, the use of a large amount of the pore former tends to be avoided in the chemical foaming method.

In addition, the use of starch, carbon powder, or the like as a pore former may increase a local temperature of the pore former during firing. This may cause inconveniences such as unevenness in firing.

Therefore, in order to avoid those problems, for example, some cases require a preparation step in which a temperature gradient from the start of temperature rise to the reaching of a firing temperature in a firing step is set to be gentler than in the related art. Accordingly, the time required in the firing step is prolonged, which may cause problems such as a reduction in manufacturing efficiency and an increase in energy cost for the firing.

On the other hand, the technique in which inert gas or the like is directly inserted into a forming raw material to produce a ceramic product by a physical action as described in Patent Document 2 does not require an increased amount of a pore former (chemical substance) as described above, which does not bring about an increase in material cost or an increase in energy cost. However, it is difficult to uniformly inject the inert gas such as nitrogen gas into the forming raw material in a quantitative and stable manner.

For this reason, the ceramic product injected with the inert gas may hold uneven pores, or the ceramic product may have an irregular porosity or an irregular pore diameter. Accordingly, there is a possibility that stable performance (catalyst performance and the like) is not exerted when the ceramic product is used as a product such as a catalyst carrier for automobile exhaust gas purification.

As a result of intensive study on the physical foaming, the inventors of the present invention have found that injection of supercritical carbon dioxide (hereinafter referred to as "supercritical $CO_2$") in the state of supercritical fluid into a forming raw material enables manufacturing of a ceramics formed body having a high porosity structure and a stable pore size (or pore diameter). Furthermore, the inventors have found that combined application of the "physical foaming" by injection of the supercritical $CO_2$ and the "chemical foaming" by addition of a conventional pore former leads to suppression of the manufacturing cost and enables manufacturing of a ceramic formed body having a high porosity structure with stable porosity and a stable pore diameter.

Herein, the supercritical fluid is a state of a substance placed under a temperature and pressure equal to a critical point or more. In this state, the substance is not separable into gas and liquid and has both properties, diffusivity attributed to gas and solubility attributed to liquid.

It is generally known that water and carbon dioxide may be in the state of the supercritical fluid, and carbon dioxide, for example, is in the state of supercritical fluid when the temperature is 31.1° C. (304.1K) or more and the pressure is 7.38 MPa or more.

A range of temperature and pressure in which the conditions beyond the critical point are satisfied is where the supercritical $CO_2$ exists in the state of the supercritical fluid. Herein, the supercritical $CO_2$ is generated by lowering the temperature of the liquefied carbon dioxide in the liquid state, and then by transferring the carbon dioxide to the state under high pressure equal to a critical pressure or more, and by continuously raising the temperature up to a critical temperature while maintaining the high pressure state equal to the critical pressure or more.

The present invention has been made in view of the above circumstances, and an object of the present invention is to provide a manufacturing method of a ceramic formed body that enables manufacturing of a ceramic structure having a high porosity structure in which the use of a pore former or an amount of the pore former is reduced and energy cost is also reduced by shortening the drying time and firing time.

Means for Solving the Problem

According to an embodiment of the present invention, there is provided the following manufacturing method of a ceramic formed body.

According to a first aspect of the present invention, a manufacturing method of a ceramic formed body is provided, involving: a mixing step in which a raw material for forming a ceramic formed body is dryly mixed, and then, a liquid is added to the obtained dry mixture to wetly mix the mixture; a kneading step in which a mixture obtained in the mixing step is kneaded; an injection step in which supercritical carbon dioxide in the state of supercritical fluid is injected into a kneaded product obtained in the kneading step; and a forming step in which a forming raw material containing the supercritical carbon dioxide obtained in the kneading step and the injection step is extruded to form the ceramic formed body.

According to a second aspect of the present invention, the manufacturing method of a ceramic formed body according to the first aspect is provided, wherein the supercritical carbon dioxide is injected in the injection step at an injection position close to a die that extrudes the forming raw material.

According to a third aspect of the present invention, the manufacturing method of a ceramic formed body according to the first or second aspects is provided, wherein the supercritical carbon dioxide is injected in the injection step at an injection amount per unit time within a range of 1.5 vol % to 20.0 vol % with respect to an extrusion amount of the forming raw material per unit time in the forming step.

According to a fourth aspect of the present invention, the manufacturing method of a ceramic formed body according to any one of the first to third aspects is provided, wherein the supercritical carbon dioxide is injected in the injection step at an injection pressure within a range of 15 MPa to 35 MPa.

According to a fifth aspect of the present invention, the manufacturing method of a ceramic formed body according to any one of the first to fourth aspects is provided, wherein the forming raw material includes a pore former.

Effects of the Invention

In a manufacturing method of a ceramic formed body according to an embodiment of the present invention, supercritical carbon dioxide is injected into a forming raw material so that a large number of pores are formed inside a ceramic formed body by the "physical foaming" with porosity being stabilized. Furthermore, using a pore former (chemical foaming) in combination forms a ceramic formed body which enables manufacturing of a ceramic structure having a high porosity structure at a reduced manufacturing cost.

DETAILED DESCRIPTION OF THE INVENTION

Hereinafter, an embodiment of a manufacturing method of a ceramic formed body of the present invention will be described with reference to the drawings. The manufacturing method of a ceramic formed body of the present invention is not limited to the following embodiment but may be modified, corrected, or improved without departing from the scope of the present invention.

The manufacturing method of a ceramic formed body 1 according to an embodiment of the present invention (hereinafter simply referred to as "the manufacturing method 1") is for manufacturing of a honeycomb structure (ceramic structure) having a high porosity structure, particularly for performing extrusion so as to form a honeycomb formed body 2 (corresponding to a ceramic formed body in the present invention).

Figure 1:
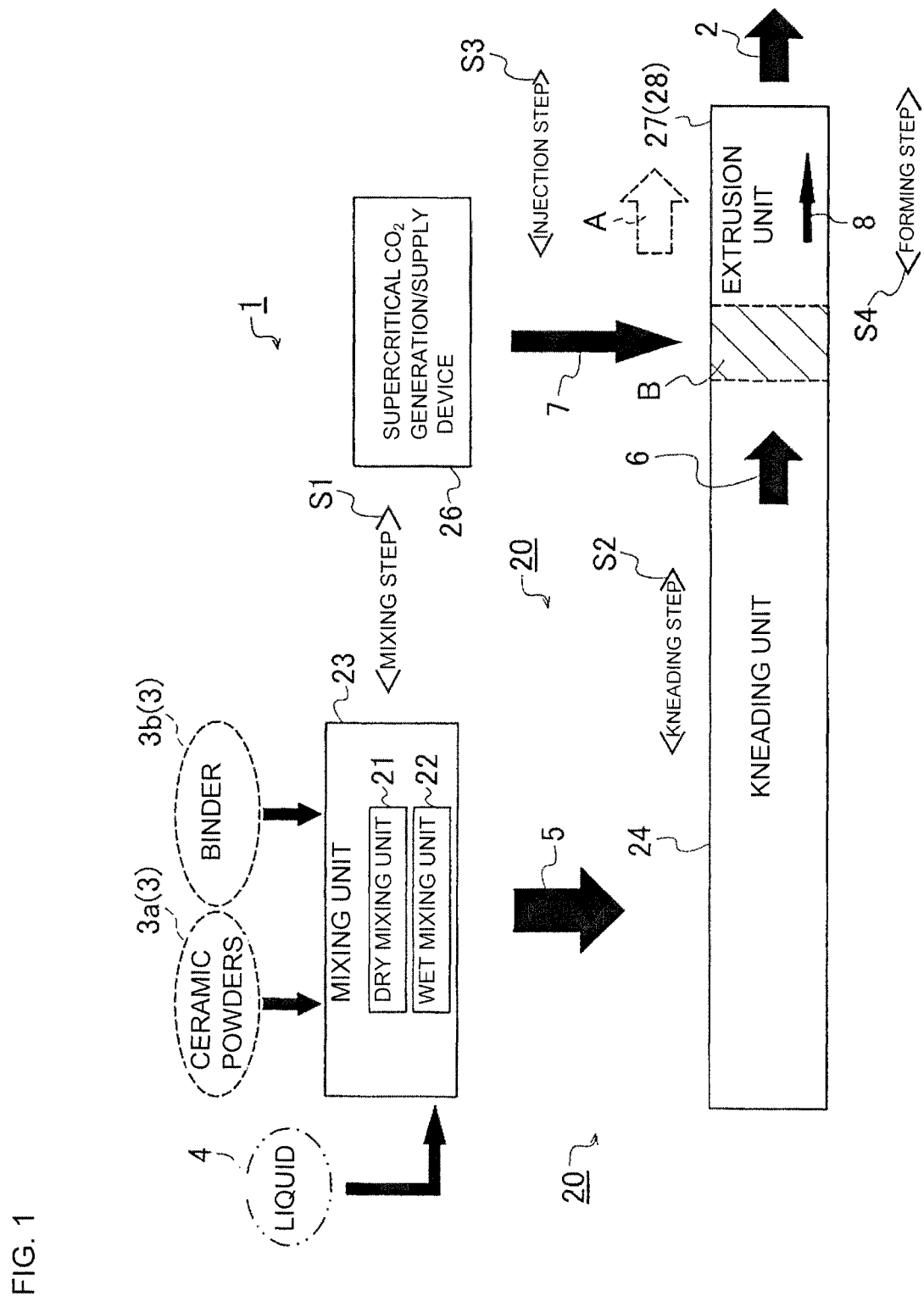
FIG. 1 is an explanatory view schematically showing a flow of a manufacturing method of a ceramic formed body according to an embodiment of the present invention and an exemplary formed body producing apparatus used in the manufacturing method.

As shown in FIG. 1 and the like, the manufacturing method 1 of this embodiment mainly involves a mixing step S1, a kneading step S2, an injection step S3, and a forming step S4. The honeycomb formed body 2 extruded from a forming raw material 8 is provided with a lattice-shaped partition wall between one end face and the other end face to define and form a plurality of cells or fluid passages. In the manufacturing method 1 of the present invention, the ceramic formed body and the ceramic structure are not limited to the honeycomb formed body 2 and the honeycomb structure formed based on the honeycomb formed body 2.

More specifically, in the mixing step S1, various raw materials 3 for forming the honeycomb formed body 2 are dryly mixed, and a liquid 4 is added to the obtained dry mixture (not shown) to wetly mix the mixture. In the kneading step S2, a mixture 5 containing the liquid 4 obtained in the mixing step S1 is kneaded to obtain a kneaded product 6.

In the injection step S3, supercritical carbon dioxide 7 (hereinafter referred to as "the supercritical $CO_2$ 7") in the state of the supercritical fluid is injected into the kneaded product 6 kneaded in the kneading step S2 to improve porosity of the honeycomb formed body 2 to be extruded. In the forming step S4, the forming raw material 8 containing the supercritical $CO_2$ 7 is extruded from a die 28 attached to an extrusion unit 27 (corresponding to an extrusion machine) at a predetermined extrusion speed and extrusion pressure so as to obtain the honeycomb formed body 2.

As schematically shown in FIG. 1, the manufacturing method 1 of this embodiment is carried out with a formed body producing apparatus 20 capable of performing the steps S1 to S4. Herein, the formed body producing apparatus 20 mainly includes: a mixing unit 23 provided with a dry mixing unit 21 (corresponding to a dry mixer) configured to dryly mix, by a batch process, the raw materials 3 in which various types of ceramic powders 3a and binder 3b are blended at a predetermined blending ratio, and a wet mixing unit 22 (corresponding to a wet mixer) configured to add the liquid 4 to the obtained dry mixture so as to wetly mix the mixture; a kneading unit 24 (a kneader) configured to convey the mixture 5 mixed in the mixing unit 23 to the extrusion unit 27 while kneading the mixture 5; a supercritical $CO_2$ generation/supply device 26 connected to the kneading unit 24 (or the extrusion unit 27) and configured to quantitatively inject the supercritical $CO_2$ 7 into the kneaded product 6 through an injection pump; and an extrusion unit 27 configured to extrude the forming raw material 8 injected with the supercritical $CO_2$ 7 so as to form a honeycomb-shaped honeycomb formed body 2.

Each component in the formed body producing apparatus 20, except for the supercritical $CO_2$ generation/supply device 26 and the injection pump, that is, the mixing unit 23, the kneading unit 24, and the extrusion unit 27, may employ the known configuration used in the conventional extrusion of the honeycomb formed body 2 (ceramic formed body). The extrusion unit 27 in the formed body producing apparatus 20 corresponds to an extrusion machine.

Furthermore, the kneading unit 24 has a hopper-like mixture feeding unit near one end of the kneading unit 24. The mixture feeding unit is configured to introduce the mixture 5 wetly mixed in the mixing unit 23 into the kneading unit 24. In the formed body producing apparatus 20, the kneading unit 24 and the extrusion unit 27 are formed in an integrated and continuous manner. Therefore, a kneading space inside the kneading unit 24 and an extrusion space inside the extrusion unit 27 communicate with each other. A screw penetrates these communicated spaces so as to convey the mixture 5 fed to the extrusion unit 27 while kneading the mixture 5. A screw drive unit is provided at one end (in the downstream side) of the kneading unit 24, being connected to an end of the screw and configured to rotatably drive the rotatably bore screw.

In the manufacturing method 1 of this embodiment, the liquid 4 added to the dry mixture in the wet mixing unit 22 of the mixing unit 23 is not particularly limited. Water, a surfactant, a lubricant, and a plasticizer may be used singly or at least one of them may be selected as the liquid 4. Adding the liquid 4 to the raw materials 3 and mixing and kneading the same yield the forming raw material 8, a homogeneous continuous body having a viscosity suitable for extrusion from the die 28 of the extrusion unit 27.

More details on the steps S1 to S4 and the components of the formed body producing apparatus 20 will hereinafter be described. In the mixing step S1, the raw materials 3 containing the ceramic powders 3a and the binder 3b are stirred and dryly mixed by the dry mixing unit 21 of the batch type. Accordingly, various types of powdery or pulverulent ceramic powders 3a and binder 3b weighed at a prescribed blending ratio are uniformly mixed with each other, causing a dry mixture in which the various raw materials 3 are uniformly dispersed (not shown).

The batched dry mixture is sent to the wet mixing unit 22, and the liquid 4 (for example, water) is added to the mixture and mixed. Herein, the wet mixing unit 22 may be either of a batch type or a continuous type. The liquid 4 is added to the dry mixture and mixed by the wet mixing unit 22 so that the liquid 4 is uniformly dispersed in the dry mixture, which yields the mixture 5.

In order to adjust the mixture 5 obtained in the mixing step S1 (by the mixing unit 23) to the forming raw material 8 having a viscosity suitable for extrusion, the kneading step S2 is carried out by the kneading unit 24. As described above, the formed body producing apparatus 20 in the manufacturing method 1 of this embodiment carries out not only the kneading step S2 and the later forming step S4 but also the injection step S3 (details will be described later) in an integrated and continuous manner. Therefore, as shown in FIG. 1, the kneading unit 24, the extrusion unit 27, and the supercritical $CO_2$ generation/supply device 26 are connected to each other.

First, the mixture 5 to which the liquid 4 is added in the mixing unit 23 is fed from the mixture feeding unit provided on one end of the kneading unit 24 and sent to the kneading space inside the kneading unit 24. The elongated screw arranged along a conveyance direction of the mixture 5 or the kneaded product 6, corresponding to the horizontal direction, is disposed in the kneading space of the kneading unit 24. When the screw rotates about an axis, the mixture 5 fed from the mixture feeding unit is gradually kneaded and conveyed toward the extrusion unit 27.

While being kneaded, the kneaded product 6 is conveyed by the kneading unit 24 to a position close to the die 28 of the extrusion unit 27. The kneaded product 6 (forming raw material 8) conveyed herein is extruded in an extrusion direction A (see FIG. 1) from a plurality of slits (not shown) provided in the die 28 of the extrusion unit 27 at a predetermined extrusion amount and extrusion pressure. Accordingly, the honeycomb formed body 2 (ceramic faulted body) is formed. After being cut, dried, and fired, the honeycomb structure is completely produced as a product.

The manufacturing method 1 of this embodiment involves the injection step S3 in which the supercritical $CO_2$ 7 generated by the supercritical $CO_2$ generation/supply device 26 is injected into the kneaded product 6, which is obtained by kneading the mixture 5 fed into the kneading unit 24 in the kneading step S2, from a connection through the injection pump at a predetermined injection pressure. This yields the forming raw material 8 in which the supercritical $CO_2$ 7 is contained in the kneaded product 6.

Herein, prior to the injection of the supercritical $CO_2$ 7, a step similar to that performed at the time of kneading to form a ceramic formed body may be performed. In other words, a deaeration step in which the air inside the kneaded product 6 is sucked and deaerated by a vacuum suction device, and a consolidation step in which the kneaded product 6 (or the forming raw material 8) is pressurized and compressed so as to densify the forming raw material 8 may be carried out. Accordingly, the air inside the kneaded product 6 is removed, and the supercritical $CO_2$ 7 is injected into the kneaded product 6 being compressed. This leads to the elimination of factors that inhibit effects of the supercritical $CO_2$ 7 so that the forming raw material 8 in which the supercritical $CO_2$ 7 is uniformly dispersed in the kneaded product 6 is obtained.

Herein, the supercritical $CO_2$ 7 is generated by the existing supercritical $CO_2$ generation/supply device 26, more specifically, it is obtained by adjusting the temperature and the pressure of liquid carbon dioxide to change its state. Since the method of generating the supercritical $CO_2$ 7 is well-known, details on the method will be omitted here.

The supercritical $CO_2$ 7 generated by the supercritical $CO_2$ generation/supply device 26 is temporarily stored in a storage tank (not shown) or the like. At the time of injection into the kneaded product 6, the supercritical $CO_2$ 7 is taken out from the storage tank and quantitatively fed to the kneaded product 6 through the injection pump at a constant injection pressure.

In the manufacturing method 1 of this embodiment, as shown in FIG. 1, a position near a boundary between the kneading unit 24 and the extrusion unit 27 and close to the upstream side of the die 28 of the extrusion unit 27 is provided with the connection connected to the supercritical $CO_2$ generation/supply device 26. In other words, the supercritical $CO_2$ 7 is injected at the position just before the die 28.

As an injection position B (the position of the connection) of the supercritical $CO_2$ 7 separates farther from the die 28, the supercritical $CO_2$ 7, while being kneaded by the kneading unit 24, changes its state to carbon dioxide, a gas under ambient temperature and ordinary pressure (changes to gaseous $CO_2$), on the way to the extrusion unit 27. Accordingly, the inside of the extrusion unit 27 is filled with the carbon dioxide, which causes an abnormal pressure. This results in failure of stable extrusion.

In other words, when the supercritical $CO_2$ 7 is injected into the kneaded product 6 at a middle position of the kneading unit 24 and at a position further close to the upstream side of the kneading unit 24, the operation of the extrusion unit 27 is not stabilized, causing difficulty in making the honeycomb structure have a high porosity structure.

Therefore, in the manufacturing method 1 of this embodiment, the injection position B (the position of the connection) of the supercritical $CO_2$ 7 is set close to a position on the upstream side of the die 28. It should be noted that the injection position B being too close to the die 28 shortens the time during which the injected supercritical $CO_2$ 7 uniformly disperses (penetrates) into the forming raw material 8, which causes unevenness of the supercritical $CO_2$ 7 in the forming raw material 8. Therefore, the injection position B is set at the kneading unit 24, at the extrusion unit 27, or between the kneading unit 24 and the extrusion unit 27 in consideration of extrusion conditions such as the extrusion speed, the extrusion amount, and the extrusion pressure of the forming raw material 8.

In the injection step S3 of the manufacturing method 1 of this embodiment, the injection amount of the supercritical $CO_2$ 7 per unit time is set to fall within a range of 1.5 vol % with respect to 20.0 vol % with respect to the extrusion amount of the forming raw material 8 per unit time in the forming step S4. Herein, an injection amount below 1.5 vol % with respect to the extrusion amount causes unsatisfactory effects of injection of the supercritical $CO_2$ 7. This makes it difficult to increase the porosity of the honeycomb formed body 2.

On the other hand, an injection amount over 20.0 vol % leads to achievement of high porosity but leads to unstable porosity and an unstable pore diameter, and also leads to an increase in influences on dynamic characteristics such as the strength and impact resistance of the honeycomb structure after firing (not shown). Therefore, the ratio of the injection amount to the extrusion amount is limited to the above range. For example, when the extrusion amount of the forming raw material 8 per unit time is 10 kg/h, the injection amount of supercritical $CO_2$ 7 per unit time may be 0.4 kg/h. In this case, the injection amount of the supercritical $CO_2$ 7 with respect to the extrusion amount of the forming raw material 8 per unit time is 4.0 vol %.

Furthermore, the injection pressure of the supercritical $CO_2$ 7 in the injection step S3 may be set, for example, in a range of 15 MPa to 35 MPa. Herein, a part of the forming raw material 8 extruded by the kneading unit 24 and the extrusion unit 27 tends to flow back toward the supercritical $CO_2$ generation/supply device 26. Therefore, injection of the supercritical $CO_2$ 7 at a constant injection pressure prevents the reverse flow of the forming raw material 8 and enables injection of the supercritical $CO_2$ 7 being dispersed uniformly in the forming raw material 8.

Furthermore, in order to prevent the reverse flow of the supercritical $CO_2$ 7 from the extrusion direction of the forming raw material 8 (the direction from the left to the right in FIG. 1) to the opposite direction (the direction from the right to the left in FIG. 1), a seal (not shown) for preventing the reverse flow of the forming raw material 8 and the supercritical $CO_2$ 7 contained therein may be provided in the kneading unit 24 or the extrusion unit 27 of the formed body producing apparatus 20. Accordingly, the forming raw material 8 and the supercritical $CO_2$ 7 stably move along the extrusion direction.

Figure 2:
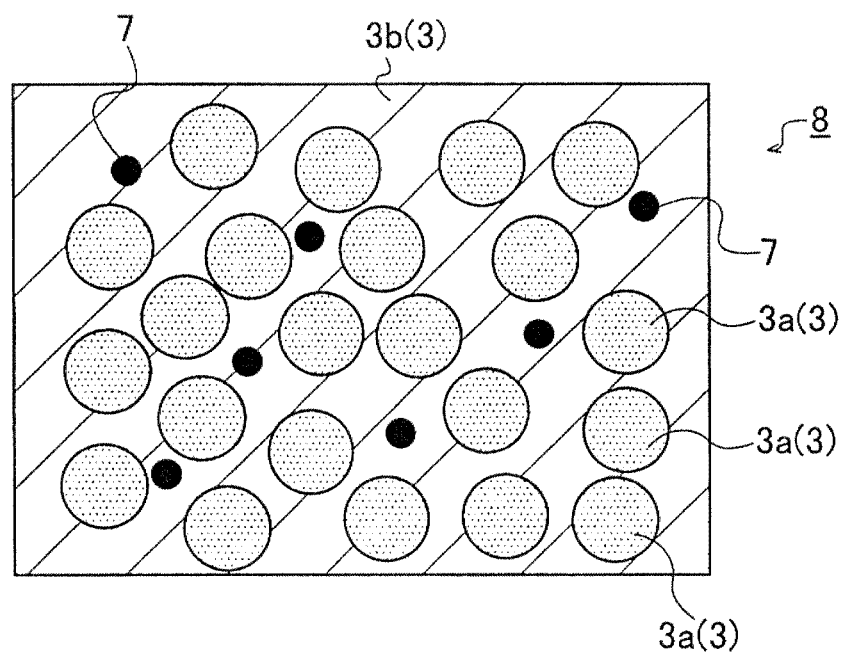
FIG. 2 is an explanatory view schematically showing the inside of a forming raw material injected with supercritical carbon dioxide.

As described above, according to the manufacturing method 1 of this embodiment, the supercritical $CO_2$ 7 is injected into the mixture 5 or the kneaded product 6 in the injection step S3 immediately before extrusion, and the forming raw material 8 is extruded as it is, that is, in the state containing the supercritical $CO_2$ 7. FIG. 2 schematically shows the inside of the forming raw material 8 immediately after the injection of the supercritical $CO_2$ 7.

The supercritical $CO_2$ 7 in the forming raw material 8 becomes free under ordinary pressure from high pressure which is the state up to this point. This increases the gas volume. In other words, each of the supercritical $CO_2$ 7 dispersed in the forming raw material 8 swells so as to increase its volume inside the forming raw material 8.

Figure 3:
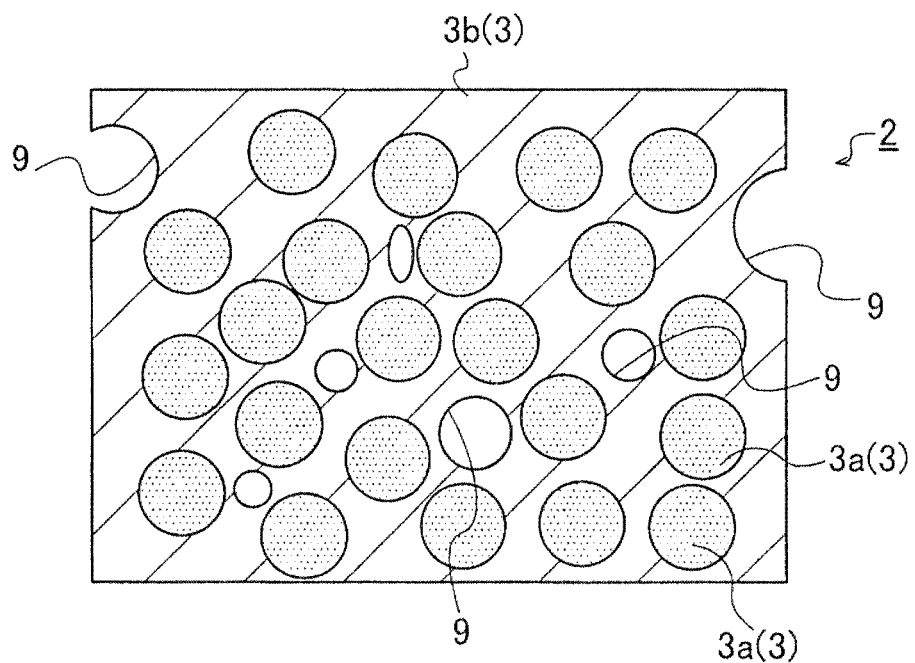
FIG. 3 is an explanatory view schematically showing the inside of a ceramic formed body immediately after extrusion.

Accordingly, a plurality of pores 9 is formed inside the honeycomb formed body 2 extruded from the die 28 (see FIG. 3). This increases the porosity of the partition wall of the honeycomb structure obtained by the next firing process. Various types of conventionally used pore formers may be added to the forming raw material 8. In combination with the "chemical foaming" method using an existing pore former, the porosity of the partition wall of the honeycomb structure is increased more.

(Example)

Hereinafter, the manufacturing method of a ceramic formed body according to the present invention will be described based on the following Example, but the manufacturing method of a ceramic formed body according to the present invention is not limited to the Example.

(1) Formation of Honeycomb Formed Body (Ceramic Formed Body)

Two kinds of honeycomb formed bodies or ceramic formed bodies (Example 1 and Comparative Example 1) were formed by the aforementioned manufacturing method of a ceramic formed body with the formed body producing apparatus. Herein, the honeycomb formed body of Example 1 was injected with a supercritical fluid (supercritical $CO_2$) by a supercritical $CO_2$ generation/supply device (available from Showa Denko Gas Products Co., Ltd.), and the honeycomb formed body of Comparative Example 1 was obtained under the same conditions as Example 1 except for the injection of the supercritical fluid. It should be noted that the formed honeycomb structure has a round pillar-shaped honeycomb diameter of 40 mm, containing cordierite as a main component and a typical pore former in its forming raw material. In the honeycomb formed body of Example 1, an extrusion amount of the forming raw material per unit time was 10 kg/h, an injection amount per unit time of the supercritical fluid fed by the supercritical $CO_2$ generation/supply device was set to 0.4 kg/h, and the injection pressure was set to 30 MPa.

(2) Measurement of Pore Diameter and Pore Volume

Each of the honeycomb formed bodies obtained in Example 1 and Comparative Example 1 was dried under the same drying conditions and then fired at the same firing conditions so as to measure the pore diameter and pore volume of a partition wall of each honeycomb structure. The pore diameter and the pore volume were measured appropriately by a well-known measuring method, a mercury intrusion technique or an Archimedes method. The results are shown in Table 1 and FIG. 4.

TABLE 1

|  | Injection of Supercritical $CO_2$ | Porosity % |
|---|---|---|
| Example 1 | With Injection | 40 |
| Comparative Example 1 | Without Injection | 32 |

(3) Effect of Injection of Supercritical $CO_2$

Figure 4:
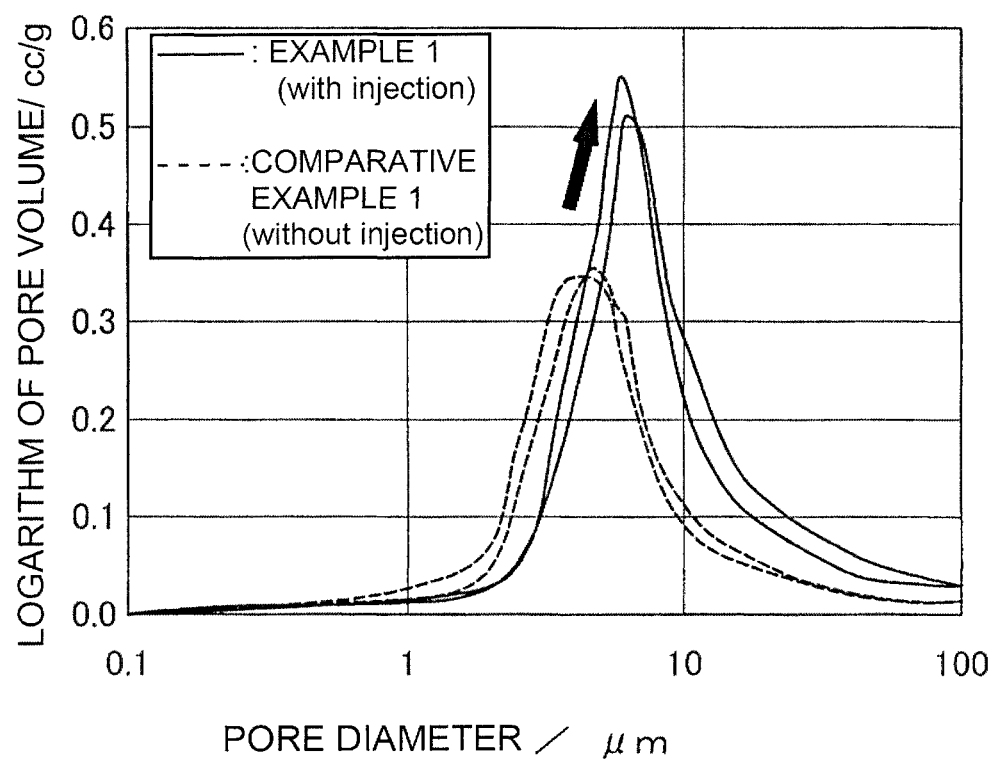
FIG. 4 is a graph showing a correlation between a pore diameter and a logarithm of a pore volume.

As shown in FIG. 4, the pore diameter and the logarithm of the pore volume as well as the porosity of the honeycomb structure of Example 1 are all higher than those of Comparative Example 1 (see the arrow). In other words, the injection of the supercritical $CO_2$ increases the pore diameter inside the partition wall of the honeycomb structure and also increases the pore volume. For this reason, it was found that the injection of the supercritical $CO_2$ enables manufacturing of a ceramic structure having a high porosity structure.

INDUSTRIAL APPLICABILITY

A manufacturing method of a ceramic formed body according to the present invention may be used in manufacturing of a ceramic formed body having a high porosity structure usable for a catalyst carrier for automobile exhaust gas purification, a diesel particulate filter, a heat reservoir, or the like.

DESCRIPTION OF REFERENCE NUMERALS

1: manufacturing method (manufacturing method of a ceramic formed body), 2: honeycomb formed body (ceramic formed body), 3: raw material, 3a: ceramic powder (raw material), 3b: binder (raw material), 4: liquid, 5: mixture, 6: kneaded product, 7: supercritical $CO_2$ (supercritical carbon dioxide), 8: forming raw material, 9: pore, 20: formed body producing apparatus, 21: dry mixing unit, 22: wet mixing unit, 23: mixing unit, 24: kneading unit, 26: supercritical $CO_2$ generation/supply device, 27: extrusion unit, 28: die, A: extrusion direction, B: injection position, S1: mixing step, S2: kneading step, S3: injection step, S4: forming step.

The invention claimed is:

1. A manufacturing method of a ceramic formed body, comprising:
    a mixing step in which a raw material for forming a ceramic formed body is dryly mixed, and then, a liquid is added to the obtained dry mixture to wetly mix the mixture;
    a kneading step in which a mixture obtained in the mixing step is kneaded;
    a deaeration step in which air inside a kneaded product obtained in the kneading step is sucked and deaerated by a vacuum suction device;
    a consolidation step in which the kneaded product is pressurized and compressed so as to densify the kneaded product;
    an injection step in which supercritical carbon dioxide in the state of supercritical fluid is injected into the kneaded product obtained in the kneading step; and
    a forming step in which a forming raw material containing the supercritical carbon dioxide obtained in the kneading step and the injection step is extruded to form the ceramic formed body;
    wherein the supercritical carbon dioxide is injected in the injection step at an injection position downstream of the deaeration step immediately before a die that extrudes the forming raw material; and
    wherein the supercritical carbon dioxide is injected in the injection step at an injection pressure within a range of 15 MPa to 35 MPa.

2. The manufacturing method of a ceramic formed body according to claim 1,
    wherein the supercritical carbon dioxide is injected in the injection step at an injection amount per unit time within a range of 1.5 vol % to 20.0 vol % with respect to an extrusion amount of the forming raw material per unit time in the forming step.

3. The manufacturing method of a ceramic formed body according to claim 1, wherein the forming raw material includes a pore former.

* * * * *